United States Patent [19]

Quackenbush et al.

[11] Patent Number: 5,793,987
[45] Date of Patent: Aug. 11, 1998

[54] HOT PLUG PORT ADAPTER WITH SEPARATE PCI LOCAL BUS AND AUXILIARY BUS

[75] Inventors: William L. Quackenbush, Palo Alto; Charles J. Naegeli, Montara; David J. Tsiang, Menlo Park; John T. Chapman, Cupertino; Glenn Lee, Fremont, all of Calif.

[73] Assignee: Cisco Systems, Inc., San Jose, Calif.

[21] Appl. No.: 685,941

[22] Filed: Jul. 22, 1996

Related U.S. Application Data

[60] Provisional application No. 60/015,805 Apr. 18, 1996.
[51] Int. Cl.$^6$ .............. G06F 3/00; G06F 13/00; H04L 9/00
[52] U.S. Cl. .......... 395/280; 345/281; 345/282; 345/283; 345/308; 380/49
[58] Field of Search .............. 380/49, 25; 395/283, 395/280, 306, 308, 828, 281, 282

[56] References Cited

U.S. PATENT DOCUMENTS

| | | | |
|---|---|---|---|
| 3,728,693 | 4/1973 | Macker et al. | 340/172.5 |
| 4,262,302 | 4/1981 | Sexton | 358/10 |
| 5,305,384 | 4/1994 | Ashby et al. | 380/29 |
| 5,386,514 | 1/1995 | Lary et al. | 395/250 |
| 5,499,346 | 3/1996 | Amini et al. | 395/308 |
| 5,519,715 | 5/1996 | Hao et al. | 395/183.06 |
| 5,519,872 | 5/1996 | Khandekar et al. | 395/775 |
| 5,530,302 | 6/1996 | Hamre et al. | 307/147 |
| 5,579,491 | 11/1996 | Jeffries et al. | 395/283 |

OTHER PUBLICATIONS

Addendum to Cisco News Release written by Steve Bauer entitled Cisco 7000 Gains Fast Ethernet Interface, Becomes Only Router Family to Support Three High-Speed Network Types released on Mar. 28, 1995 entitled Summary of Port Adapter and Fast Ethernet Interface Processor History.

*Primary Examiner*—Thomas H. Tarcza
*Assistant Examiner*—Carmen D. White
*Attorney, Agent, or Firm*—Marger, Johnson, et al.

[57] ABSTRACT

A pluggable port adapter is used for connecting PCI devices to a host system through a PCI local bus while also adding functionality to the host system. The port adapter communicates with the host system through a port adapter/host interface that includes the PCI local bus and an auxiliary bus. The auxiliary bus is used for controlling the additional circuitry on the port adapter. A PROM on the adapter card is used for identifying the port adapter type, serial number and hardware revision. The auxiliary bus is used for conducting JTAG testing and is used by the host system to program logic devices on the port adapter. The logic devices can be reprogrammed in the field by the host system to repair bugs and to enhance performance and/or functionality. A power control circuit on the port adapter is controlled by the auxiliary bus for conducting hot swap operations.

28 Claims, 5 Drawing Sheets

HOT PLUG PORT ADAPTER WITH SEPARATE PCI LOCAL BUS AND AUXILIARY BUS

CO-PENDING APPLICATION

This application claims the benefit of U.S. Provisional Application No. 60/015.805, filed Apr. 18, 1996.

FIELD OF THE INVENTION

This invention relates to digital computer based systems and more particularly to digital computers that include a PCI (Peripheral Component Interconnect) local bus.

BACKGROUND OF THE INVENTION

Digital computers use input/output (I/O) buses for transferring information between peripheral devices and a computer central processing unit and computer memory. I/O functions are also required in systems with multiple distributed processors and multiple distributed memories.

There are a variety of widely used I/O bus architectures such as ISA (Industry Standard Architecture bus) and EISA (Extended Industry Standard Architecture bus). A relatively new bus architecture is the PCI local bus. The PCI Local Bus Specification for the PCI local bus is available from the PCI Special Interest Group, 5200 Elam Young Parkway, Hillsboro, Oreg.

In general, before a peripheral device communicates and transfers data over the PCI local bus, the device must be configured using PCI local bus configuration space commands. For example, the peripheral device may include command registers, timers, memory base, limit registers and other control circuits that may require configuration.

In some systems, it may be desirable that other functions be conducted in conjunction with some peripheral devices. However, in some situations, the PCI local bus may not be suitable for conducting some of the operations related to the additional functions. For example, field programmable gate array devices which include volatile programming memory can be connected to the PCI local bus. Such a device must be programmed each time it is powered up, but can not be programmed over the PCI local bus since the device must be programmed before interacting with the PCI local bus.

Powered on devices might be connected or disconnected from the PCI local bus (Hot Swap) while other devices on the PCI local bus remain powered on. Hot swapping can corrupt logical states in PCI devices and corrupt data being transferred on the PCI local bus.

Hot swapping may also damage some devices connected to the PCI local bus such as devices using Complimentary Metal Oxide Semiconductor (CMOS) technology. CMOS devices are exposed to large currents when inputs to CMOS receivers are within the CMOS switching region. Some CMOS receivers have two field effect transistors (FETs) connected in series with a first FET connected to a positive power supply rail and a second FET connected to a negative power supply rail. When the input to the two FETS is in the switching region, both FETs can be continuously turned on at the same time creating a DC current path directly through the CMOS device. The continuous on state of the two FETs can dissipate enough power to damage the CMOS device.

CMOS devices also experience latch-up conditions when an input is driven beyond one of the CMOS power supply rails. In the latch-up condition, parasitic transistors in the CMOS structure dissipate large amounts of power that can destroy the CMOS device. Both power dissipation conditions described above can result from hot swapping on the PCI local bus.

SUMMARY OF THE INVENTION

A pluggable port adapter is used to connect one or more PCI agents to a host system through a PCI local bus to add functionality to the host system. A PCI agent is a device attached to a PCI local bus that is capable of functioning as a PCI local bus initiator and/or target compliant to the PCI local bus specification. The port adapter communicates with the host system through a port adapter/host interface that includes the PCI local bus and an auxiliary bus. The PCI agents are configured and communicate in a normal manner over the PCI local bus while other functionality on the port adapter is controlled independently through the auxiliary bus.

The host system uses the auxiliary bus to determine the identity of a port adapter which the host system then uses to determine what programming and configuration is required. The auxiliary bus is also used by the host system for testing devices on the port adapter and programing circuitry on the port adapter such as field programmable gate arrays (FPGAs). FPGAs with volatile program memory must be programmed each time they are powered up and can be reprogrammed in the field by the host system to repair bugs and to enhance performance and/or functionality.

In one embodiment of the invention, the PCI local bus in the port adapter is coupled to one or more port controllers each connecting to one or more communication lines such as local area networks (LAN) like ethernet and wide area networks (WAN). In another embodiment of the invention, devices other than communication line controllers are connected to the PCI local bus. For example, logic on the port adapter performing different functions such as data encryption/decryption and data compression/decompression is connected to the PCI local bus.

The logic receives data from the PCI local bus and then retransmits the data on the PCI local bus in a reprocessed form. The auxiliary bus is used for programmable logic on the port adapter such as logic implemented with an FPGA.

The auxiliary bus is also used for conducting hot swap operations in which the port adapter is unplugged from the host system while the host system is powered and operating. The port adapter includes a connector with two power enable pins that are shorter than other auxiliary bus pins and PCI local bus pins. The shorter power enable pins allow the port adapter and host system to anticipate and, in turn, respond to a hot swap condition.

When the port adapter is connected to the host system during a hot swap condition, control circuitry starts a controlled power-up sequence. When the port adapter is disconnected from the host system during a hot swap condition, the control circuitry starts a controlled power-down sequence.

A hot swap protocol between the port adapter and the host system discontinues data communications on the PCI local bus in the port adapter when the port adapter is not at an operational power level. When the port adapter is disconnected from the host system, signals coming from host bridge circuitry are driven to known safe states to prevent potentially high currents from damaging devices during on-line insertion operations. The hot swap protocol also prevents corruption of data on the PCI local bus and corrupting logic states in the host.

DETAILED DESCRIPTION OF THE INVENTION

Figure 1:
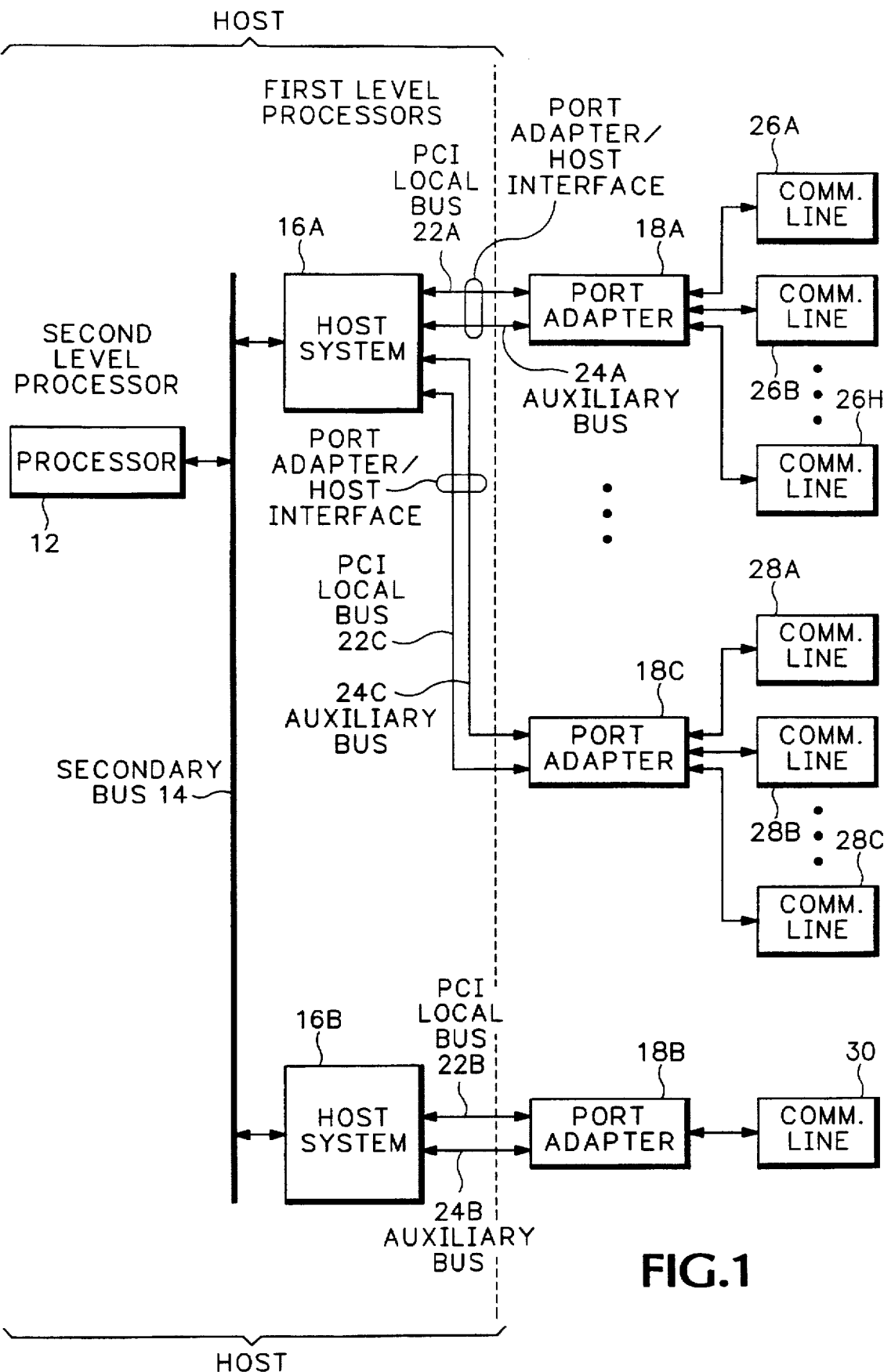
FIG. 1 is a block diagram of port adapters according to the invention coupled to a host system.

FIG. 1 is a block diagram showing a port adapter 18A connected to a host system according to the invention. A port adapter/host interface comprises a 32 bit PCI local bus 22A and an auxiliary bus 24A each coupled between the port adapter 18A and a host 16A. One or more communication lines 26A–26H are coupled to the port adapter 18A.

One or more additional port adapters are optionally coupled to the host 16A each through a separate PCI local bus and separate auxiliary bus. Port adapter 18C represents at least one additional port adapter connected via PCI local bus 22C and auxiliary bus 24C to host 16A. Communication lines 28A–28C are coupled to the port adapter 18C.

A secondary bus 14 couples a second host 16B and a second level processor 12 to host 16A. Host 16B is coupled by a PCI local bus 22B and an auxiliary bus 24B to a port adapter 18B. The port adapter 18B is similar to port adapters 18A and 18C and is coupled to a communication line 30.

In one embodiment of the invention, communication lines 26A–26H, 28A–28C and 30 comprise local area networks (LANs) like ethernet and token ring networks or wide area networks. In another embodiment of the invention, a port adapter may not necessarily connect to communication lines. The port adapter may alternatively contain logic for preforming alternative functions. For example, data encryption/decryption and data compression/decompression logic on the port adapter can be used to process data transferred over the PCI local bus.

The PCI local bus 22A transfers commands and data between the communication line controllers (not shown) for communication lines 26A–26H and the host 16A. The PCI local bus protocol is described in detail in the PCI Local Bus Specification available from the PCI Special Interest Group and is hereby incorporated by reference.

The auxiliary bus 24A is used by the processor 16A to identify the port adapter type, serial number and hardware revision. The auxiliary bus 24A is also used for conducting hot swap operations, JTAG testing and programming logic that may be included on the port adapter and are described in detail below.

The first level hosts (processors 16A and 16B), secondary bus 14 and second level processor 12 are all defined as a host or host system. In an alternative embodiment, there are not two processor levels and the host system comprises a single host coupled directly to the port adapter.

Figure 2:
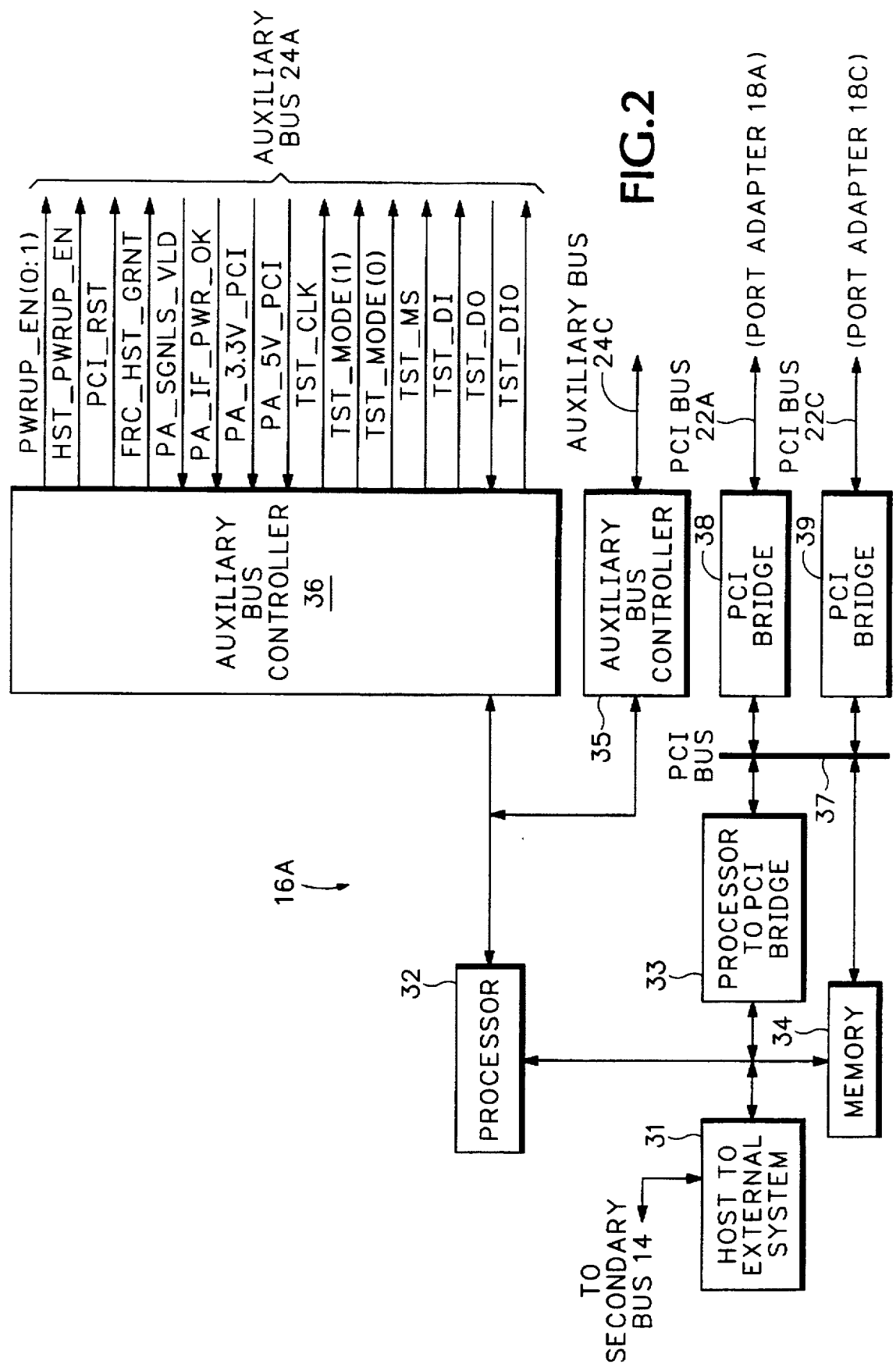
FIG. 2 is a detailed block diagram for a host shown in FIG. 1.

FIG. 2 is a detailed block diagram for one of the hosts 16A shown in FIG. 1. A processor 32 is coupled to a memory 34, a bridge 31 and a processor to PCI bridge 33. The memory 34 and bridge 33 are also connected directly to the PCI bus 37. The bridge 31 is connected to secondary bus 14. A PCI bridge 38 and a PCI bridge 39 are each coupled at a first end to PCI bus 37. PCI bridge 38 is connected at a second end to port adapter 18A through PCI local bus 22A and PCI bridge 39 is connected at a second end to port adapter 18C (FIG. 1) through PCI local bus 22C. A separate PCI bridge is used to connect each port adapter to host 16A.

Separate auxiliary bus controllers 36 and 35 couple the processor 32 to each auxiliary bus 24A and 24C, respectively, and are described in detail below.

Memory 34 is used for temporary storage for data and data descriptors that are passed between port adapters 18A–18C or between the port adapters and processor 16A. Memory 34 is also used to store command lists, queues and status data.

The PCI to PCI bridges may be the commercially available integrated circuits sold by the Digital Equipment Corporation under the designation type 21050. The PCI bridges 38 and 39 are located on the host side of the port adapter/host interface and control the signal levels on the PCI local buses 22A and 22C even when no port adapter is connected. Thus, the PCI bridges 38 and 39 can safely set signals on the PCI local bus preventing damage to both the host and the port adapters when the port adapter is plugged into a powered host during a hot swap operation.

PCI bridge circuits are known to those skilled in the art and are available from a number of merchant semiconductor companies, such as Digital Equipment Corporation. The PCI bridge circuits 38 and 39 are described in detail in the PCI to PCI Bridge Architecture Specifications Rev. 1.0 Apr. 5, 1994 available from the PCI Special Interest Group, 5200 Elam Young Parkway, Hillsboro, Oreg.

Figure 3:
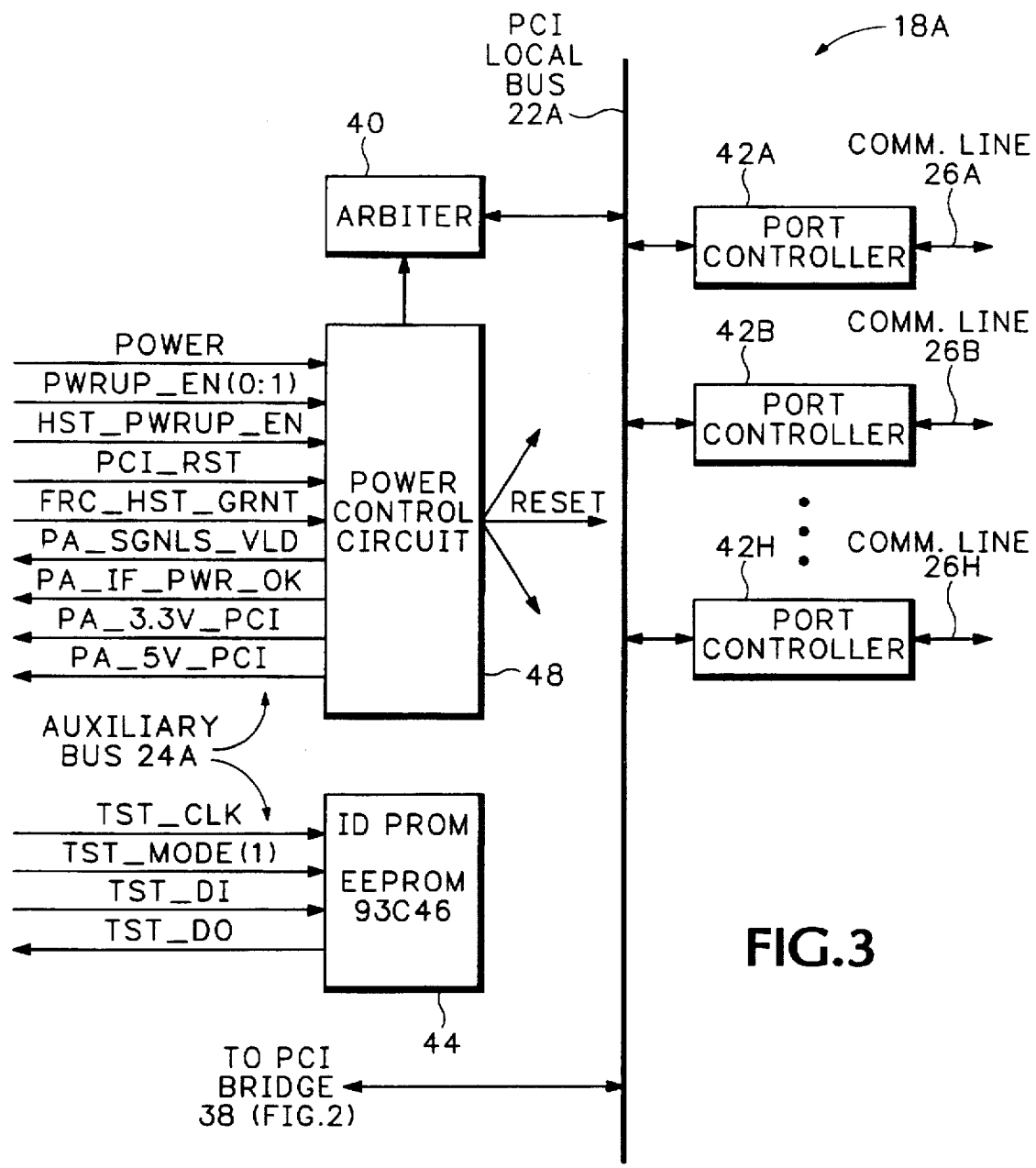
FIG. 3 is a detailed block diagram for one of the port adapters shown in FIG. 1.

FIG. 3 is a detailed block diagram for one of the port adapters 18A shown in FIG. 1. Multiple port controllers 42A–42H connect the communication lines 26A–26H, respectively, to PCI local bus 22A. Port controllers 42A–42H represent one or more PCI agents used for interfacing communication lines to a PCI local bus. The PCI local bus 22A is coupled to the port controllers 42A–42H and the PCI bridge 38 (FIG. 2).

Local Bus Arbiter

A PCI local bus arbiter 40 determines when each device gets access to the PCI local bus for data and task transfer. For example, the port controllers 42A–42H and the bridge 38 in processor 16A operate on the PCI local bus 22A according to standard PCI local bus protocol described in the PCI Local Bus Specification.

The following is one example of arbitration priorities and is only one of a variety of arbitration priorities that might be used in this invention. Arbiter 40 assigns highest arbitration priority to bridge 38 in processor 16A (FIG. 2) and assigns lower arbitration priorities to requests from the port controllers 42A–42H. The arbiter 40 provides port controllers 42A–42H access to the PCI local bus 22A according to their bandwidth and latency requirements. If all of the port controllers 42A–42H are the same type, the arbiter 40 gives equal access to each port controller using an arbitration scheme such as round-robin. If no device is requesting access to the PCI local bus 22A, the arbiter 40 parks the host bridge 38 on the PCI local bus 22A. This insures that bus signals are driven to valid levels and helps minimize the access latency of the processor 16A on the PCI local bus.

Test Port

Of particular significance to the present invention is the test port which comprises a portion of the auxiliary bus 24A and is coupled to an identification programmable read only memory 44 (ID PROM 44). The ID PROM 44 is a commercially available serial EEPROM sold by the National Semiconductor Corporation under the designation type 93C46. The test port includes seven auxiliary bus lines identified in FIGS. 1, 2 and 3 and which operate as defined below:

TST_CLK: Test Port Clock. Timing reference for the ID PROM and other test port circuitry.

TEST_MODE|1:0|: Test Port Mode|1:0|. Controls the operations and functionality of the test port. For example, the test port mode lines may enable the ID PROM 44 for reading or writing.

TST_MS: Test Mode Select. Depends on the functionality implemented by the test port. For example, the TST_MS line can be used as the JTAG MODE_SELECT signal.

TST_DI: Test Data In. TST_DI is a serial data input to the port adapter used for programming through the test port.

TST_DIO: Test Data Input/Output. TST_DIO is a bidirectional line and may be driven by either the port adapter test port or by the processor 32 in processor 16A. The meaning of TST_DIO depends on the functionality implemented by the test port.

TST_DO: Test Data Out. TST_DO is a serial data output from the test port to the host. One use of the signal on the TST_DO line is to identify to the host 16A the specific type of port adapter. For example, when the ID PROM 44 is accessed, TST_DO is driven by the ID PROM 44 and sends ID information to the host. When the ID PROM 44 is not being accessed, the meaning of TST_DO depends on other circuitry, if any, implemented in the test port.

The ID PROM 44 allows the processor 16A to determine what type of port adapter is connected so the host can determine what type of configuration, if any, is needed and what configuration algorithm to use. Specifically, the ID PROM 44 contains information about the port adapter type, hardware revision level, serial number, manufacturing datecode and the manufacturing test and repair history of the adaptor. Some of the test port signals may vary from port adapter to port adapter depending on the implemented test port functionality for the communication lines. Thus, the ID PROM 44 allows in-circuit programming by the processor 16A for customized configuration of each port adapter.

To read data from the ID PROM and write data into the ID PROM (i.e., program the ID PROM), the TST_MODE [1] line and the TST_CLK are used to first indicate to the ID PROM 44 that data or commands are being sent serially over the TST_DI line. The TST_DI line then commands the ID PROM 44 to either read or write data at an identified address location. For a write command, the processor 16A serially sends the data over the TST_DI line to the identified address location. For a read command, the ID PROM 44 sends data at the identified EEPROM address location to the processor 16A over the TST_DO line.

Test port functionality and some of the test port signals are permitted to vary from one port adapter to another. As a consequence, the identity of a port adapter must be determined in order to know what test functionality is implemented and what programming/configuration is needed. This requires that the method of accessing the ID PROM 44 must be the same for all port adapters.

To minimize the number of signals in the test port and minimize restrictions on how signals are used, a standard initialization sequence is used to insure that the test port circuitry on the port adapter is in a known state before accessing the test port. This initialization routine, for example, allows the ID PROM output data and output data from other test port circuitry to connect to the same TST_DO line on the same port adapter without contention.

Hot Swap

A power control circuit 48 allows on-line insertion and removal of the port adapter 18A into the port adapter/host connector of a powered host 16A (hot swap). Lines coupled to the power control circuit 48 are included in the auxiliary bus 24A and separate from the PCI local bus 22A. The power control circuit 48 is coupled through the auxiliary bus to the auxiliary bus controller 36 (FIG. 2).

The power control circuit includes integrated circuits sold by Motorola under the designation MC34064, Maxim and Analog Devices under the designation MAX705 and a commercially available 74HCT151 device.

Auxiliary bus lines used for conducting hot swap operations between the processor 16A and the port adapter 18A are defined below:

PWRUP_EN|1:0|: Power-up Enable. PWRUP_EN|1:0| are two of the signals used to control when the adapter draws power from the supply potentials used by the port adapter. PWRUP_EN|1:0| are assigned to two short pins in a connector 50 (see FIG. 5). The short pins are the last to make contact when the port adapter 18A is plugged into the processor 16A and are the first pins to break contact when the port adapter is removed from the processor 16A.

HOST_PWRUP_EN: Host Power-up Enable. HOST_PWRUP_EN is asserted by the processor 16A only when the host side of the port adapter/host interface is fully powered. The host power-up enable line is one of several lines that determine when the port adapter draws power from the +5.15 and +12.2 volt supply potentials in the port adapter/processor 16A connector 50.

PA_SGNLS_VLD: Port Adapter Signal Valid. Indicates when signals in the port adapter/host interface sourced by the port adapter, including PCI local bus signals sourced by the port adapter, are valid, invalid or about to become invalid.

PA_IF_PWR_OK: Port Adapter Interface Power OK. Indicates power level on the port adapter is within or outside specification.

FRC_HOST_GRNT: Force Host PCI Local Bus Grant. A line driven by the processor 16A to control access to the PCI local bus 22A. When the FRC_HOST_GRNT line is asserted, the arbiter 40 ignores all requests for access to the PCI local bus and grants the PCI local bus to the processor 16A. When the FRC_HOST_GRNT line is deasserted, the arbiter 40 recognizes all requests for access to the PCI local bus and grants access to the bus according to standard arbitration protocol.

A 3.3 Volt and a 5.0 Volt signaling environment are each defined in the PCI Local Bus Specification. The two signaling environments are not electrically compatible. Accidentally connecting devices from the two signaling environments on the same PCI local bus can damage the devices.

Two signals on the host 16A and two signals from the power control circuit 48 on the port adapter 18A identify the two signaling environments as follows:

HOST_3.3V_PCI: Host 3.3 Volt PCI Local Bus Compatible. HOST_3.3V_PCI indicates whether the PCI local bus agent on the host side of the port adapter/host interface is compatible with the PCI local bus 3.3 Volt signaling environment.

HOST_5V PCI: Host 5 Volt PCI local Bus Compatible. HOST_5V_PCI indicates whether the PCI local bus agent on the host side of the port adapter/host interface is compatible with the PCI local bus 5 Volt signaling environment.

PA_3.3V_PCI: Port Adapter 3.3 Volt PCI local Bus Compatible. PA_3.3V_PCI is driven by the port adapter and indicates whether the PCI local bus agents on the port adapter are compatible with the PCI local bus 3.3 Volt signaling environment.

PA__5V__PCI: Port Adapter 5 Volt PCI local Bus Compatible. PA__5V__PCI is driven by the port adapter and indicates whether the PCI local bus agents on the port adapter are compatible with the PCI local bus 5.0 Volt signaling environment.

Assertion of either PA__3.3V__PCI or PA__5V__PCI indicates to the host 16A that the port adapter 18A is installed. The PA__3.3V__PCI or PA__5V__PCI signals operate in such a manner that they can be read by the host regardless of whether the port adapter is powered or unpowered.

Figure 4:
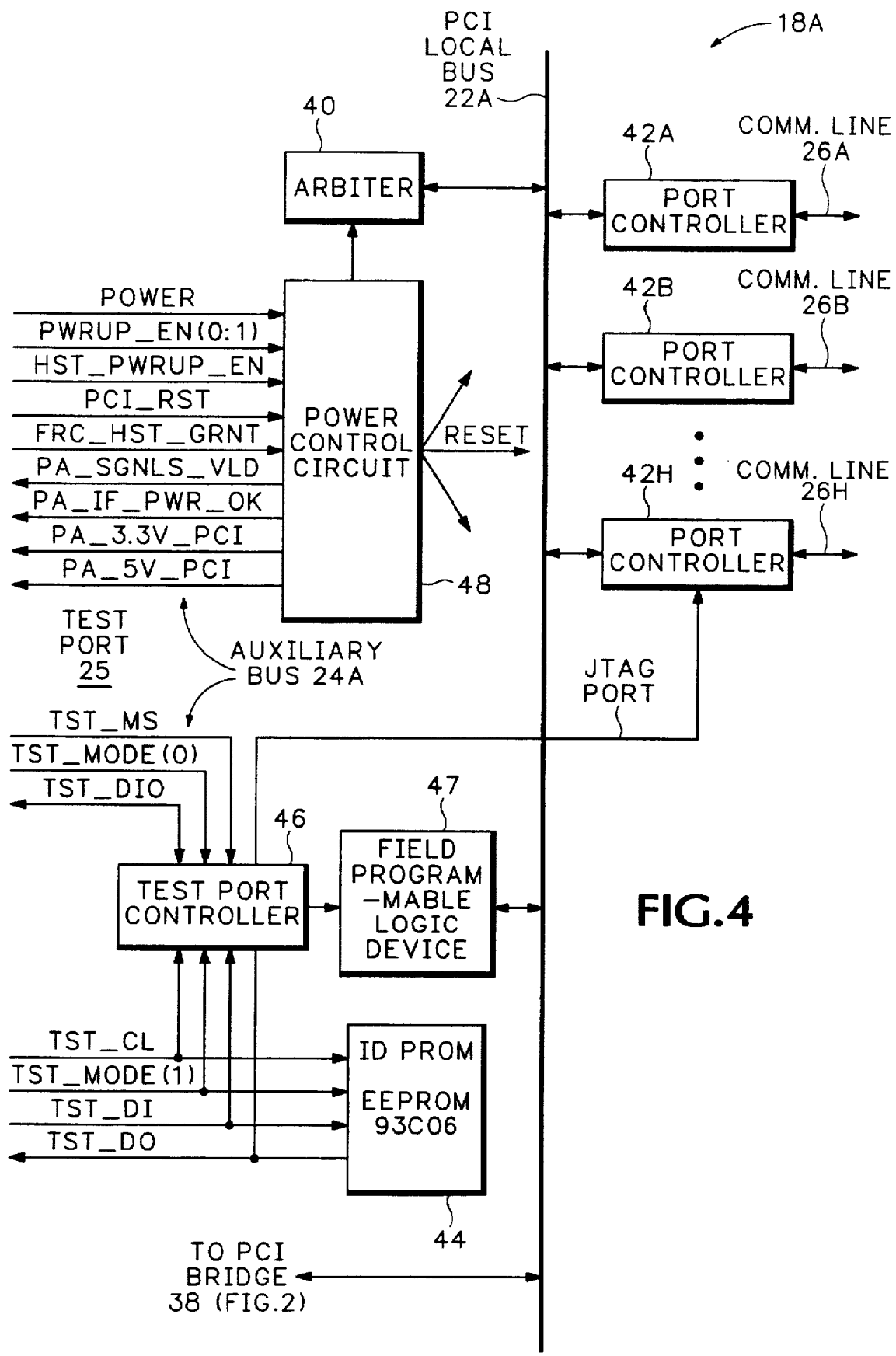
FIG. 4 is a detailed block diagram for the port adapter according to another embodiment of the invention having additional functionality.

Referring to FIG. 4, JTAG testing is conducted from the processor 16A through the auxiliary bus 24A. A JTAG port on selected PCI devices, such as the port controllers 42A–42H, are connected to a test port controller 46. The test port controller 46 generates signals via the auxiliary bus 24A that control JTAG testing on the PCI devices. The JTAG protocol is specified by I.E.E.E. standard 1149.1 which defines a method for testing devices on the port adapter 18A.

A field programmable logic device 47 is connected to controller 46 and used to implement part of the port adapter's functionality. The functionality of the field programmable logic device 47 is determined by data stored in an internal static ram which is part of the logic device. When the port adapter is powered on, the static ram is reprogrammed by the host 16A using the test port auxiliary bus 24A. The processor 32 in host 16A (FIG. 2) sends configuration instructions and configuration data to the test port over auxiliary bus 24A.

In addition to field programmable logic devices that store their configuration in volatile static RAM and must be programmed after each powerup, there are field programmable logic devices that store their configuration in non-volatile EEPROM which does not require programming after each powerup, but may be reprogrammed in the field to fix bugs or add functionality. Either type of device can be programmed through the test port of the auxiliary bus. For example, a port controller can be implemented with an FPGA that is programmed through the auxiliary bus in addition to the FPGA 47.

The field programmable logic device can be used as control between different communication lines and the PCI local bus. Alternatively, the logic device can operate as a data compression/decompression for compressing and decompressing data or a data encryption/decryption engine.

Figure 5:
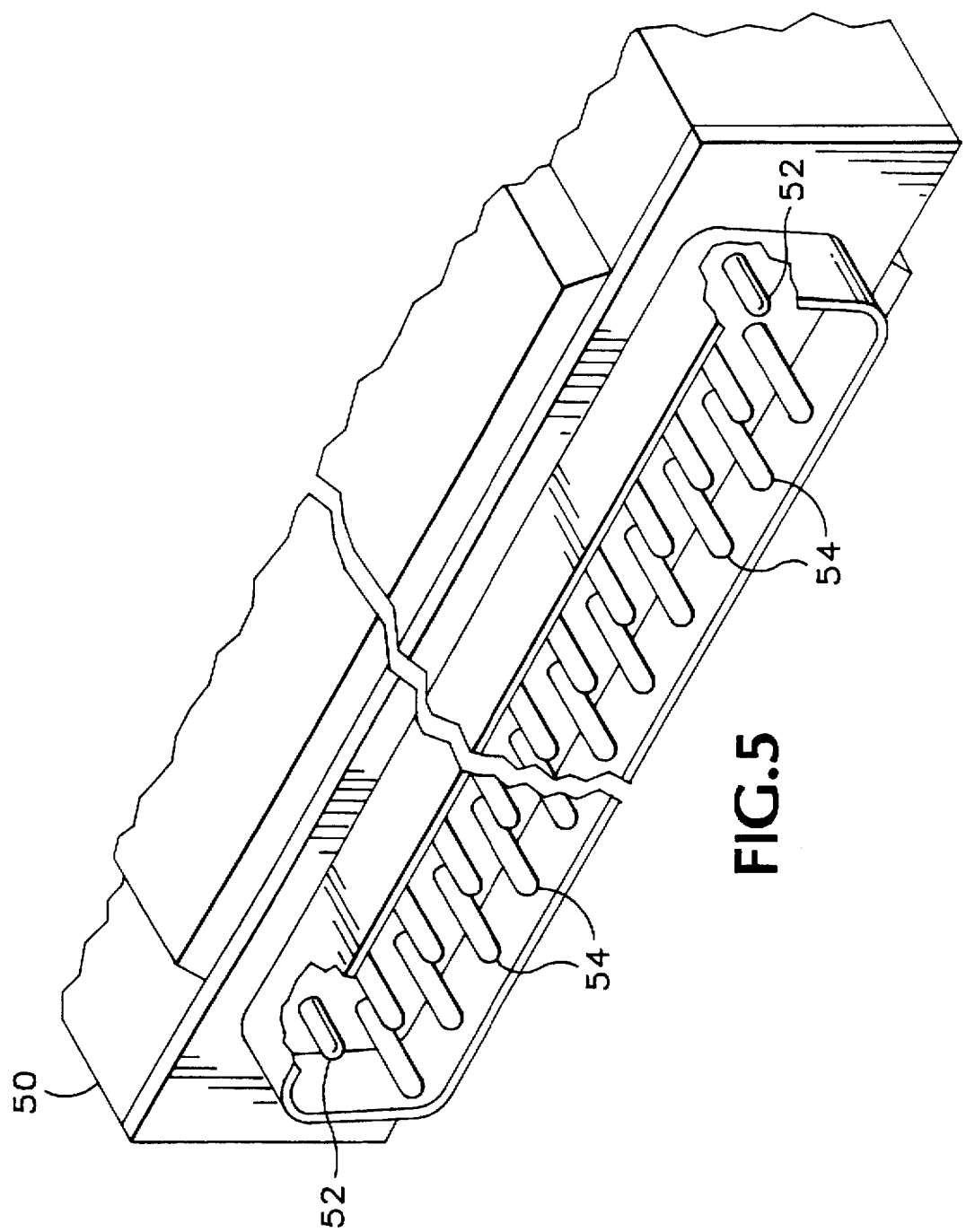
FIG. 5 is a perspective view of a port adapter connector.

FIG. 5 is a diagram of a connector 50 on the port adapter 18A that plugs into the processor 16A. The connector 50 includes pins 54 used for connecting the PCI local bus 22A to the PCI bridge 38 and the auxiliary bus 24A to the auxiliary bus controller 36 in processor 16A. Two of the connector pins 52 are shorter than the rest of pins 54. Pins 52 are located on opposite ends of the connector 50 and connect to the PWRUP_EN[1] and PWRUP_EN[0] lines described above. The connector is sold by AMP Corporation and is designated as an AMP Champ 0.050 Series Low-Profile docking connector.

The PWRUP_EN[1] and PWRUP_EN[0] lines connected to the short pins 52 must be asserted by the host system before the port adapter begins power-up. Pins 52 are shorter than the pins 54 and located on opposite ends of connector 50. If connector 50 is misaligned, the PWRUP_EN[1] and PWRUP_EN[0] lines will not be asserted and the port adapter will not power-up.

When the port adapter 18A is plugged in, the power control circuit 48 looks at the HOST__3.3v__PCI and HOST__5V__PCI lines to determine the signaling environment of the host 16A. If there is an incompatibility between the signaling environment in port adapter and the host, the power control circuit 48 will not power-up.

Port Adapter Insertion

Referring to FIGS. 3, 4 and 5, when the connecter 50 from port adapter 18A is plugged into the processor 16A, all of the long pins 54 make contact to associated lines in a processor 16A receptor plug (not shown). The PWRUP_EN[1:0] are biased to the deasserted state by resistors on the adapter so that their state is well defined before the short connector pins make contact.

The host monitors the PA__3.3V__PCI and PA__5V__PCI lines to determine when a port adapter is installed and to determine the port adapter signaling environment. The processor 16A can report back to a host operator the status of a non-operational port adapter. For example, the host 16A can convey to the operator that a card is plugged into the port adapter/host interface port but that the card did not power-up because of a signaling environment mismatch.

As soon as the ground and power pins on connector 50 are connected to ground and power in the host 16A, logic in the power control circuit 48 immediately turns on. The PWRUP_EN[1] and PWRUP_EN[0] are asserted (driven LOW) by the host 16A. The logic circuitry in power control circuit 48 detects when the connector 50 is fully inserted by detecting low states on the PWRUP_EN[1] and PWRUP_EN[0] lines.

Only after PWRUP_EN[1] and PWRUP_EN[0] are asserted (driven LOW) (i.e., short pins 52 make contact with the processor 16A), the power control circuit 48 begins a port adapter power-up sequence after the HOST_PWRUP_EN is asserted (driven HIGH) by the host 16A and after verifying compatible signaling environments between the host 16A and the port adapter 18A.

When the port adapter logic that interfaces to the host has powered up, the PA__IF__PWR__OK line is asserted by the port adapter 18A. The host 16A then turns on PCI clocks in the PCI local bus that go to the port adapter 18A. Other signals on the PCI local bus that had previously been driven to a high impedance state or an otherwise safe state are driven to normal states by the host 16A.

The power control circuit 48 keeps the RESET line continuously asserted during power-up or power-down. Once the voltages are fully powered up, the reset line continues to be asserted for a predetermined about of time, for example, 200 milliseconds. When the port adapter power-up and reset sequences are completed, the PA__SGNLS__VLD line is asserted by the port adapter 18A. The host must take the bridge out of reset for the port adapter reset to be deasserted. The bridge is taken out of reset when PA__IF__PWR__OK is asserted.

Port Adapter Removal

When the port adapter 18A is removed from a powered host 16A, the short pins 52 connected to the PA__PWRUP__EN[1] or PA__PWRUP__EN[0] lines are the first to disconnect from the receiving socket on the host 16A. The port adapter upon receiving a deasserted PA__PWRUP__EN[1] or PA__PWRUP__EN[0] line immediately deasserts the PA__SGNLS__VLD line to the host 16A and begins a power-down operation.

Deassertion of the PA__SGNLS__VLD line is a warning to the host 16A that a hot swap extraction operation is beginning. A time delay built into the power control circuit 48, allow voltages in the port adapter to stay valid for a predetermined amount of time.

While the port adapter voltages are still within specification, the host 16A begins termination of PCI local bus transactions with the port adapter 18A. The host 16A asserts the FRC_HOST_GRNT line to the port adapter arbiter 40 through the power control circuit 48. The asserted FRC_HOST_GRNT line forces the arbiter 40 to grant the PCI local bus 22A to the host 16A and deny access to all other devices such as port controllers 42A–42H.

Typically, data communications on the port adapter PCI local bus 22A are terminated within 30 microseconds using standard protocols defined in the PCI Local Bus Specification. Because the connector 50 typically takes several milliseconds for removal from the host, 30 microseconds is sufficient to terminate communications on the PCI local bus 22A without corrupting data.

When PA_IF_PWR_OK is deasserted, drivers (not shown) on the host 16A side of the port adapter/host interface place a HIGH impedance state on all PCI local bus signals. After a few PCI local bus clock cycles, selected address, enable and parity are asserted (driven LOW) by the host 16A while remaining signals stay in a HIGH impedance state. This insures that excessive currents will not flow through the PCI local bus devices between a powered host 16A and an unpowered port adapter.

When the PA_IF_PWR_OK line is deasserted, the host 16A is notified that the voltage on the port adapter logic that interfaces with the host is no longer within specification. The processor 16A, in response, turns off the clocks on the PCI local bus.

While the invention has been shown with respect to preferred embodiments thereof, various changes in form and detail may be made without departing from the scope and spirit of the invention. The scope of the invention is defined by the appended claims.

We claim:

1. A system for interconnecting devices to a computer system, comprising:
   a host computer system;
   a PCI device having a PCI bus interface;
   a pluggable port adapter coupling the PCI device to the host computer system, the port adapter including the following:
      a PCI local bus detachably coupled to both the host system and the PCI device providing a detachable PCI local bus interconnection for transferring standard PCI configuration and communication commands and data between the host computer system and the PCI device;
      hardware configurable port adapter circuitry in the port adapter coupled to the PCI local bus; and
      an auxiliary bus detachably coupled in parallel with the PCI local bus directly between the host system and the port adapter, the auxiliary bus providing a detachable interconnection used by the host computer to configure the port adapter circuitry into different hardware configurations independently from the PCI local bus.

2. A system according to claim 1 wherein the PCI device comprises at least one of a communication device, a data compression/decompression device and a data encryption/decryption device.

3. A system according to claim 1 wherein the port adapter includes a power control circuit coupled to the auxiliary bus providing on-line insertion and removal of the port adapter to and from the host system while said host system remains in a powered-on state, the host computer and power control circuit negotiating power-up for the port adapter through the auxiliary bus without using the PCI local bus.

4. A system according to claim 1 wherein the auxiliary bus comprises lines for conducting JTAG testing on the PCI devices.

5. A system according to claim 1 wherein the port adapter includes a programmable read only memory coupled to test signals in the auxiliary bus and containing port adapter identification data, the test signals including a test clock providing a timing reference for the memory, a test port mode signal for controlling reading and writing in the memory, a test data-in signal for programming the memory, and a test data-out signal for identifying the port adapter to the host computer.

6. A system according to claim 1 wherein the configurable port adapter circuitry comprises a field programmable logic device coupled between the auxiliary bus and the PCI local bus, the logic device upon initial attachment to the host computer system having no PCI local bus interface capability and configured by the host system over the auxiliary bus into a PCI agent capable of communicating over the PCI local bus.

7. A system according to claim 1 wherein the PCI local bus and the auxiliary bus in the port adapter are detachably coupled to the host computer though a connector plug.

8. A detachable port interface system for coupling a host system to multiple PCI devices, comprising:
   multiple pluggable port adapters each pluggably coupled to the host system, each one of the port adapters including the following:
      a PCI local bus pluggably coupled between the associated PCI devices and the host system; and
      an auxiliary bus pluggably coupled in parallel with the PCI local bus between the port adapter and the host system, the auxiliary bus controlling circuitry in the port adapter independently of the PCI local bus.

9. A system according to claim 8 wherein at least two of the port adapters are coupled to a common host in the host system, the PCI local bus on each of said at least two port adapters coupled to a separate PCI bridge circuit in the host and the auxiliary bus for each of said at least two port adaptor cards coupled to a separate auxiliary bus controller in the host.

10. A system according to claim 8 wherein each one of the PCI devices comprise one of a communication line controller, data compression/decompression device and a data encryption/decryption device.

11. A system according to claim 10 wherein each one of the port adapters includes a power control circuit coupled to the auxiliary bus, the power control circuit providing on-line insertion and removal of the port adapter from the PCI local bus without effecting operation of other port adapters on the PCI local bus.

12. A system according to claim 11 wherein the auxiliary bus includes lines for conducting JTAG testing of the PCI devices.

13. A system according to claim 12 wherein each one of the host systems includes the following:
   a host PCI local bus;
   a separate PCI bridge circuit coupled between the host PCI local bus and the PCI local bus in each connected port adapter;
   a processor operably coupled to the host PCI local bus; and
   a separate auxiliary bus controller coupled between the processor and the auxiliary bus in each connected port adapter and operating independently of the host PCI local bus.

14. A method for plugging multiple PCI devices into a host system through an associated generic port adapter having a PCI local bus and an auxiliary bus, the method comprising the following steps:

connecting the PCI devices to the PCI local bus in the associated port adapter;

plugging the PCI local bus and plugging the auxiliary bus in the associated port adapter into the host system;

transmitting data between the PCI devices and the host system over the PCI local bus; and controlling power-up and power-down circuitry on the associated port adapter over the auxiliary bus independently from the PCI local bus without disturbing communications of other port adapters coupled to the host system on the PCI local bus.

15. A method according to claim 14 including the following steps:

initiating disconnection of the port adapter from the host system;

asserting a power-up enable signal on the auxiliary bus according to the port adaption disconnect, the power-up enable signal directing the port adapter to power-down;

transmitting a signal valid condition signal from the port adapter to the host system on the auxiliary bus indicating that the port adapter is beginning a power-down operation;

granting access of the PCI local bus to the host system and denying access to any of the PCI devices, according to the port adapter power-down operation.

16. A method according to claim 14 including the following steps:

monitoring a power supply level in the port adapter;

generating a reset signal in the port adapter when the power supply level in the port adapter is outside a given range necessary to operate the port adapter; and granting the PCI local bus to the host system while the reset signal is being generated.

17. A method according to claim 14 including the following steps:

providing a field programmable device on at least some of the port adapters that is not, operational on the PCI local bus after a port adapter reset;

transmitting configuration commands to the field programmable device on the port adapter through the auxiliary bus, the configuration commands configuring the field programmable device as a PCI agent capable of communicating on the PCI local bus; and operating the configured field programmable device as a PCI agent on the PCI local bus.

18. A method according to claim 14 including the following steps:

comparing two separate signaling environments supported in both the host system and the port adapter; and disabling a power-up sequence for the port adapter when a mismatch exists between the two signaling environments in the host system and the port adapter.

19. A hot swap system for a PCI local bus, comprising:

a host system;

a port adapter including a PCI local bus and an auxiliary bus coupled between the host system and the port adapter, the auxiliary bus controlling power-up of the port adapter; and a connector having multiple interface pins coupled to the PCI local bus and auxiliary bus of the port adapter for plugging the port adapter into the host system;

the connector including at least one power-up enable pin connected to the auxiliary bus which is shorter than the interface pins, the power-up enable pin initiating commands over the auxiliary bus for powering up and resetting the port adapter.

20. A system according to claim 19 wherein the auxiliary bus includes a power OK line indicating the port adapter has powered to an operational condition, the host system enabling a PCI local bus reset according to the power OK line.

21. A system according to claim 20 wherein the auxiliary bus includes a signal valid line, the host system enabling PCI local bus communication according to the signal valid line.

22. A system according to claim 19 including a controller connected to the auxiliary bus for testing PCI devices on the port adapter.

23. A system according to claim 19 wherein the PCI local bus supports two separate operational power levels and the auxiliary bus includes two operational power level lines monitored by the port adapter for host system and port adapter power level compatibility.

24. A method for hot swapping a port adapter with a powered host system on a PCI local bus, comprising:

asserting a power-up enable signal indicating the port adapter is being electrically attached to the host system;

initiating a port adapter power-up sequence according to the power-up enable signal;

asserting a power OK signal from the port adapter to the host system when the port adapter has powered up to an operational condition; and asserting a signal valid signal when the PCI local bus is ready for transferring data.

25. A method according to claim 24 including the following steps:

deserting the power-up enable signal when the host system begins disconnection from the host system;

deserting the signal valid signal according to the power-up enable signal for beginning a port adapter power-down operation;

asserting a host grant signal to the port adapter from the host system according to the signal valid signal for terminating communications on the PCI local bus; and deserting the power OK signal by the port adapter for indicating that the port adapter is no longer in an operational state.

26. A method according to claim 24 including the following steps:

supporting two separate operational power levels on the PCI local bus;

checking the operational power level on the host system with the port adapter; and powering up the port adapter when the port adapter and the host system have the same operational power level.

27. A system according to claim 8 wherein the circuitry in the port adapter comprises a hardware configurable logic circuit coupled between the auxiliary bus and the PCI local bus, the logic circuit configured through the auxiliary bus to function as a PCI local bus agent.

28. A pluggable port adapter interface board for coupling a peripheral device to a host computer system, comprising:

a local bus detachably coupled to both the host system and the peripheral hardware device providing a local bus interconnection for conducting data transfers between the host computer system and the peripheral device;

configurable port adapter circuitry in the port adapter board coupled to the local bus; and configuration lines coupled in parallel with the PCI local bus directly between the host system and the port adapter circuitry, the configuration lines used by the host computer independently from the PCI local bus to configure the hardware in the port adapter circuitry into an agent on the local bus.

* * * * *

UNITED STATES PATENT AND TRADEMARK OFFICE
CERTIFICATE OF CORRECTION

PATENT NO. : 5,793,987
DATED : August 11, 1998
INVENTOR(S) : William L. Quackenbush, et al.

It is certified that error appears in the above-identified patent and that said Letters Patent is hereby corrected as shown below:

On the title page, item [75], add-- William Eugene Jennings, Cary, N.C. --as additional co- inventor.

Signed and Sealed this

Twenty-seventh Day of February, 2001

Attest:

NICHOLAS P. GODICI

Attesting Officer     Acting Director of the United States Patent and Trademark Office